United States Patent [19]
Okubo

[11] Patent Number: 5,520,448
[45] Date of Patent: May 28, 1996

[54] METHOD FOR CONTROLLING THE BRAKING PRESSURE APPLIED IN AN ANTI-LOCK CONTROL BRAKING SYSTEM DURING YAW CONTROL

[75] Inventor: Satomi Okubo, Saitama, Japan

[73] Assignee: Akebono Brake Industry Co., Ltd., Tokyo, Japan

[21] Appl. No.: 338,750

[22] Filed: Nov. 9, 1994

[30] Foreign Application Priority Data

Nov. 9, 1993 [JP] Japan .................................. 5-279312

[51] Int. Cl.$^6$ ............................................. B60T 8/66
[52] U.S. Cl. ........................................... 303/148; 303/149
[58] Field of Search ................................ 303/100, 111, 303/96, 103, 149, 148; 364/426.02

[56] References Cited

U.S. PATENT DOCUMENTS

| | | | |
|---|---|---|---|
| 4,374,421 | 2/1983 | Leiber | 303/96 |
| 4,893,880 | 1/1990 | Arikawa | 303/111 |
| 5,188,432 | 2/1993 | Schmitt et al. | 303/111 |
| 5,207,483 | 5/1993 | Shimada et al. | 303/111 |
| 5,286,098 | 2/1994 | Okubo | 303/100 |

Primary Examiner—Matthew C. Graham
Attorney, Agent, or Firm—Cushman Darby & Cushman

[57] ABSTRACT

When, after a yawing moment control starts in an anti-lock braking system the rear wheel on the low-μ road surface is locked and the speed of that wheel decreases below the threshold value VT1, the brake hydraulic pressure to the wheel on the low-μ road surface is decreased. At the same time, the brake hydraulic pressure to the rear wheel on the high-μ road surface is also decreased at reduced rate relative to the decrease on the low-μ wheel. As a result, a higher braking force acts on the wheel on the high-μ road surface than on the wheel on the low-μ road surface. When the speed of the wheel on the low-μ road surface decreases below the threshold value VT1 and when the speed of the wheel on the high-μ road surface decreases below the pressure-decrease restriction removal threshold value VT, the brake hydraulic pressure to the wheel on the high-μ road surface is decreased to be nearly equal to that to the wheel on the low-μ road surface to prevent the wheels on the high and μ road surfaces from being locked.

4 Claims, 11 Drawing Sheets

$Vr = Vs - \Delta V$ $Vr = Vv - \Delta V$

REDUCTION OF ΔV

Vr SLOPE MADE GENTLER

METHOD FOR CONTROLLING THE BRAKING PRESSURE APPLIED IN AN ANTI-LOCK CONTROL BRAKING SYSTEM DURING YAW CONTROL

BACKGROUND OF THE INVENTION

1. Field of the Invention

The present invention relates generally to an anti-lock brake control system and method, and, more particularly, to an anti-lock brake control system and method which independently controls the brake pressures to the right and left front wheels, and commonly controls the brake pressures to the right and left rear wheels on the basis of the lower one of the wheel speeds of the right and left rear wheels when the front wheels are in a yawing moment control mode and when the lower speed rear wheel is in an anti-lock brake control mode, the brake pressure applied to the higher speed rear wheel is decreased at a smaller decreasing rate than the brake pressure applied to the lower speed rear wheel.

2. Related Art

While a vehicle is running on a slippery road such as a frozen road, the wheels may become locked when a brake is applied since the friction force acting between the road surface and the wheel tires is small. In a known anti-lock control system, as means for preventing this lock state, the braking forces are controlled such that a slippage factor of the wheel against the road surface is maintained at a predetermined value.

When a vehicle equipped with the anti-lock control system runs on a road, and only one of the right and left wheels runs on a road surface having low friction coefficient (referred to as "μ split road"), such as a frozen road surface, if the brakes for the right and left wheels are independently controlled, the braking force applied to the wheel on the road surface having high friction coefficient (referred to as "high-μ road surface") becomes larger than that applied to the wheel on the low-μ road surface. In an extreme case, the vehicle may spin. Particularly in the short-wheel base vehicles, high gravity-center vehicles, and vehicles of large scrab radius, it is likely that spin state will occur.

To cope with this problem, the present inventor has previously proposed another anti-lock control system as disclosed in, for example, commonly assigned U.S. Pat. No. 5,286,098. In the anti-lock control system of this patent, there exists a select low mode in which the braking forces applied to the right and left wheels are controlled on the basis of the lower one of the wheel speeds of those wheels, that select low mode being employed for the brake control of that right and left front wheels. In the anti-lock control system, when the front wheel on the low-μ road surface are locked, a brake hydraulic pressure applied to the front wheel on the high-μ road surface is decreased to the brake hydraulic pressure to the front wheel on the low-μ road surface so that a yaw moment control is accomplished.

However, the anti-lock control system in which the yawing moment control is applied to only the front wheels has the following problem. In the yawing moment control mode, the wheel on the high-μ road surface cannot effectively utilize the friction of the road surface. Further, the brake hydraulic pressures applied to the right and left rear wheels are decreased at the same pressure decreasing rate on the basis of the select low control. Therefore, the rear wheel on the high-μ road surface also insufficiently utilizes the friction of the road surface. In other words, the braking force applied to the rear wheel on the high-μ road surface cannot be effectively utilized. As a result, the braking distance must be undesirably long.

SUMMARY OF THE INVENTION

The present invention was made in view of the foregoing problems accompanying the conventional and proposed anti-lock brake control method. Accordingly,, an object of the invention is to provide an anti-lock brake control system and method in which braking force applied to the higher-speed rear wheel can be effectively utilized.

The above and other objects can be achieved through an anti-lock control system which, according to the present invention, functions such that when the front wheels are under yawing moment control and when one of the rear wheels slips on a high-μ road surface while the other normally runs on a low-μ road surface, the brake pressure to the rear wheel on the high- road surface is decreased at a pressure decreasing rate relative to the rear wheel on the low-μ road surface. Thus the braking force applied to the rear wheel on the high-μ road surface is efficiently utilized, to realize a further reduction the braking distance.

An anti-lock brake control system and method according to the present invention independently controls the brake pressures to the right and left front wheels. It controls the brake pressures to the right and left rear wheels based on the higher one of the wheel speeds of the right and left rear wheels. When the right and left wheels run on the surfaces of different conditions and when the brake pressures applied to the right and left front wheels are in a yawing moment control mode and the lower speed rear wheel is in an anti-lock brake control mode, the brake pressure to the higher speed rear wheel is decreased at a smaller decreasing rate than that to the lower speed rear wheel.

When the front wheels in a yawing moment control mode and when the rear wheel on tie low-μ road surface is locked so that its wheel speed decreases to below a threshold value VT1, the brake hydraulic pressure decreases to release the rear wheel from its locked state. At the same time, the brake hydraulic pressure applied to the rear wheel on the high-μ road surface decreases at a lower decelerating rate than the brake hydraulic pressure applied to the rear wheel turning at the lower speed. Therefore, the rear wheel on the high-μ road surface receives a higher brake hydraulic pressure than the rear wheel on the low-μ road surface.

When the speed of the rear wheel on the low-μ road surface decreases to below the threshold value VT1, the braking force excessively acts on the rear wheel on the high-μ road surface and the speed of the rear wheel on the high-μ road surface decreases to below a pressure-decrease restriction releasing threshold value VT. In this case, the brake hydraulic pressure to the rear wheel on the high-μ road surface must be abruptly released. Therefore, the brake hydraulic pressure to the wheel on the high-μ road surface is decreased to be nearly equal to that to the wheel on the low-μ road surface, thereby preventing the rear wheels on the high and low-μ road surfaces from being locked.

Thus, when the front wheels are under the yawing moment control, the braking force applied to the higher-speed rear wheel can be effectively utilized, thereby realizing a further reduction of the braking distance.

DESCRIPTION OF THE PREFERRED EMBODIMENTS

The preferred embodiments of the present invention will be described with reference to the accompanying drawings.

Figure 1:
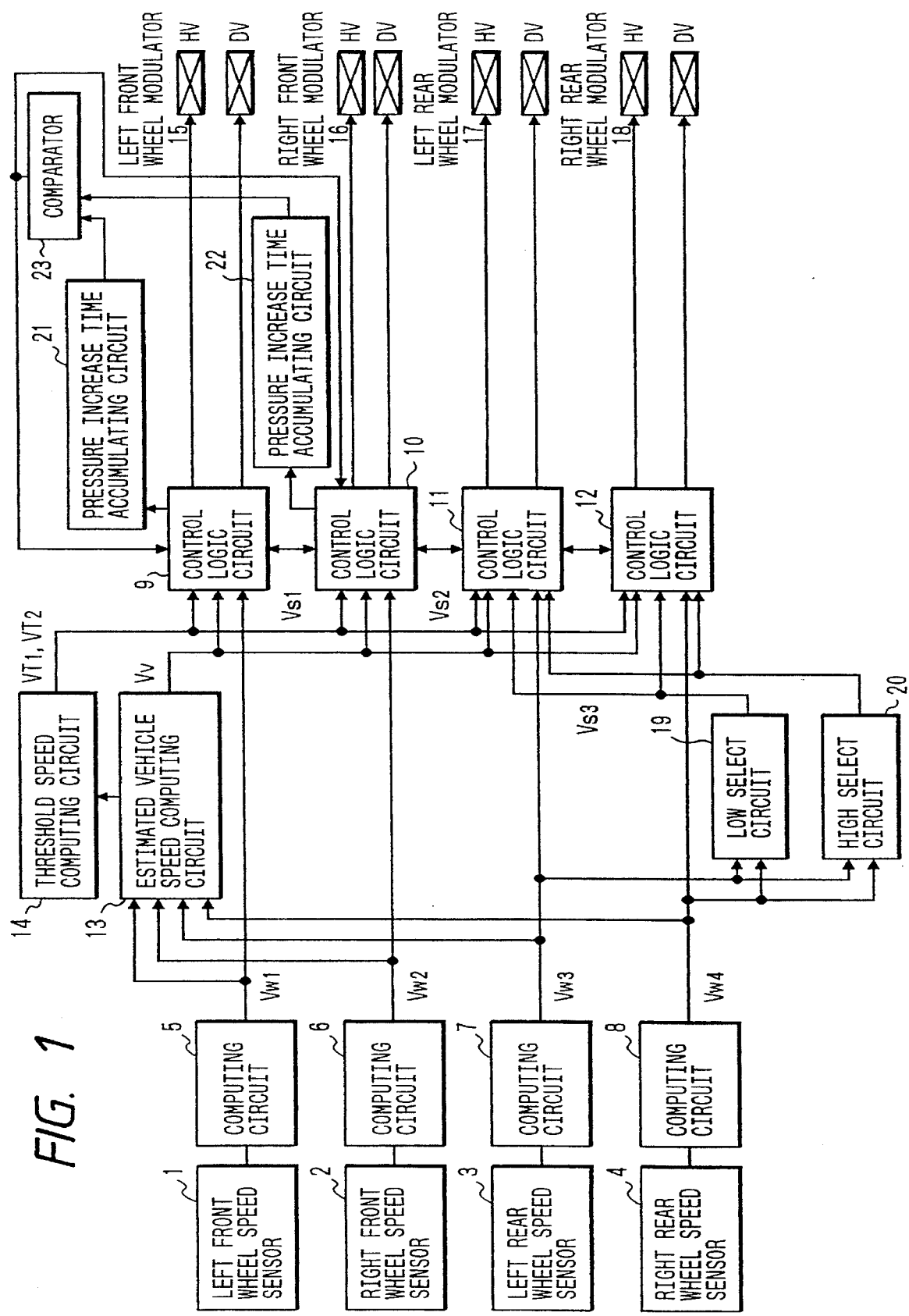
FIG. 1 is a block diagram showing an anti-lock control system according to an embodiment of the present invention.
Figure 2:
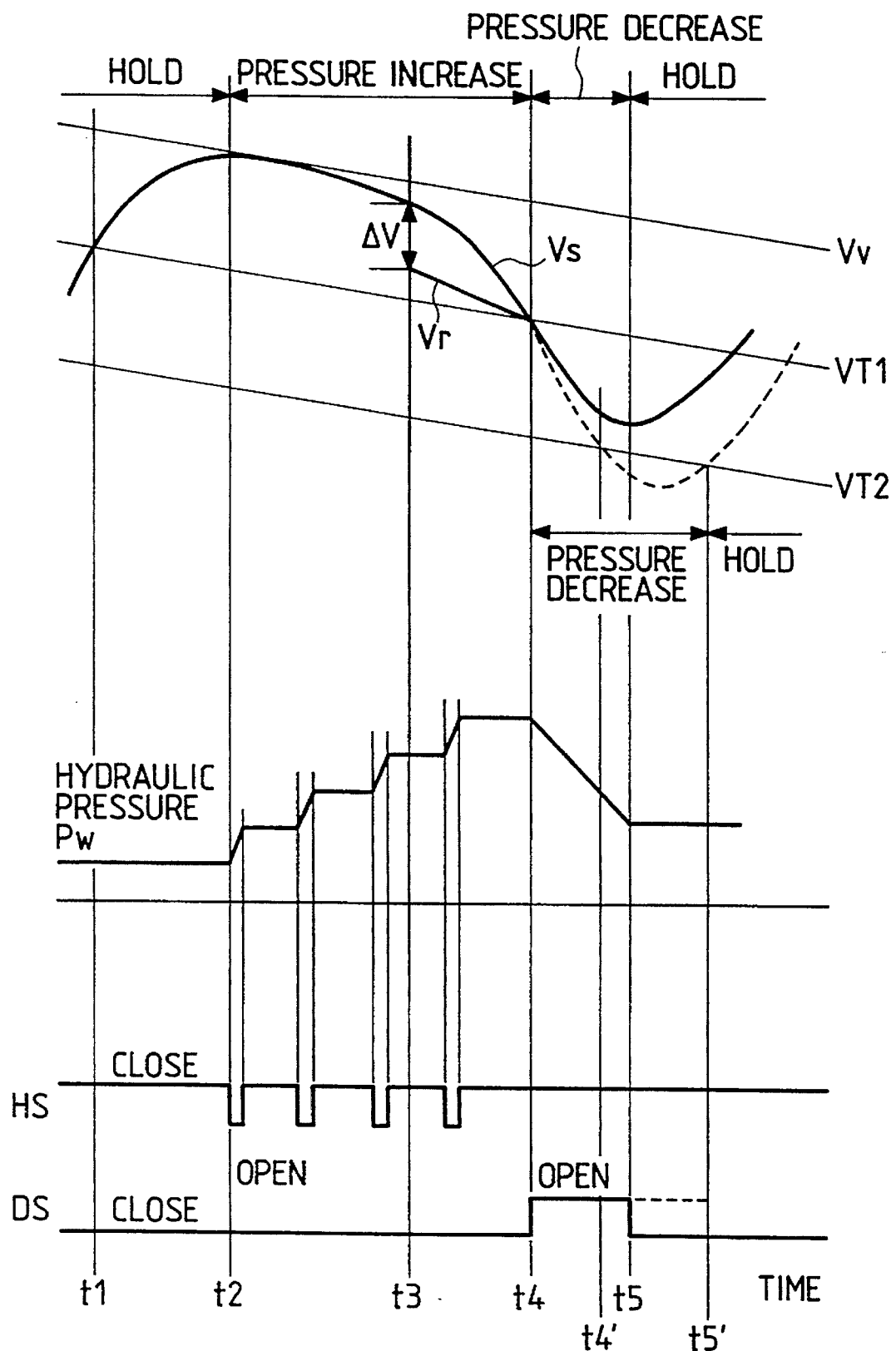
FIG. 2 is a graph showing a relationship of brake hydraulic pressure to the front wheel and wheel speed when an anti-lock control is performed.
Figure 7:
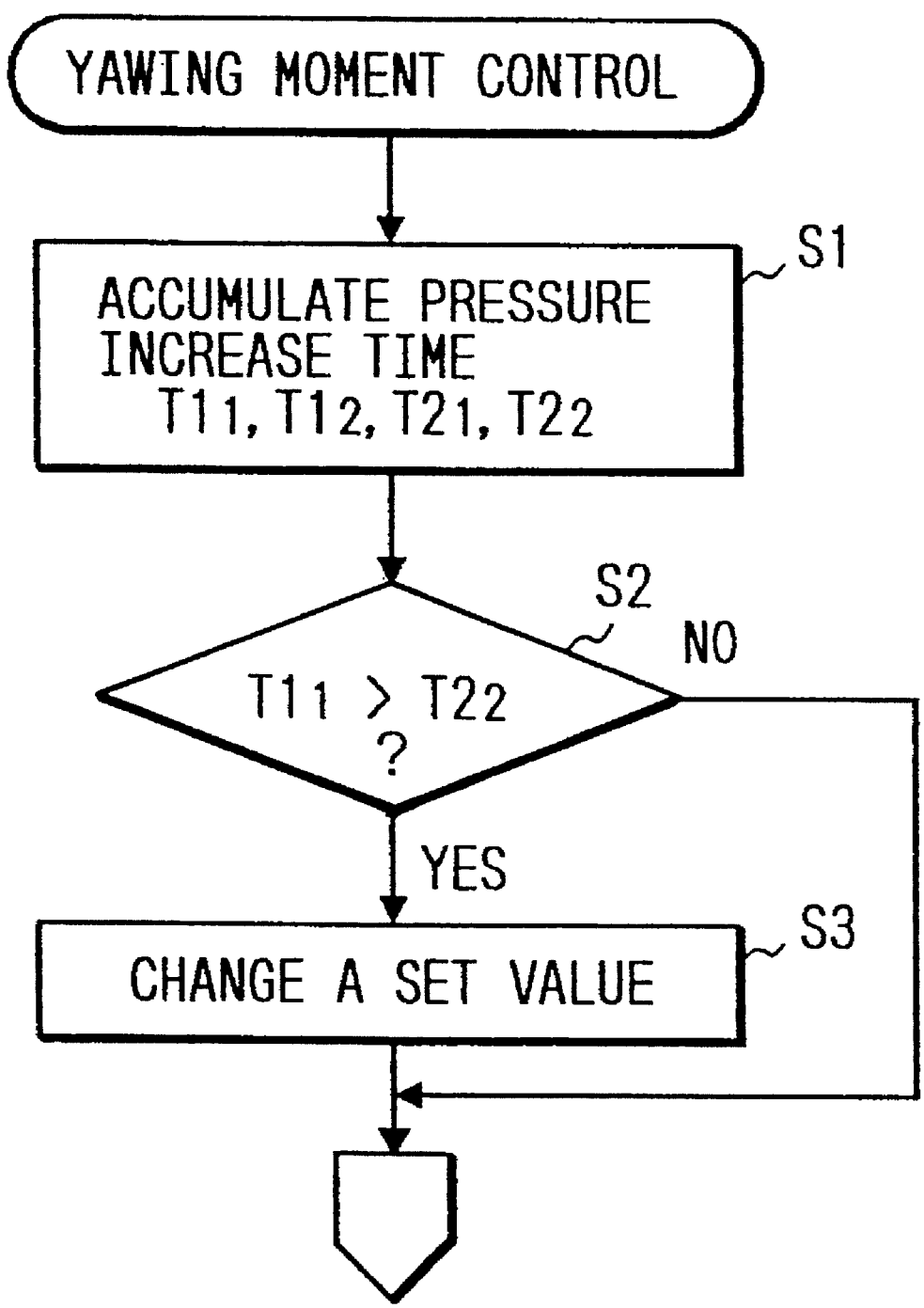
FIG. 7 is a flow chart showing the yawing moment generation preventing control according to the first embodiment of the present invention shown in FIG. 3.
Figure 9:
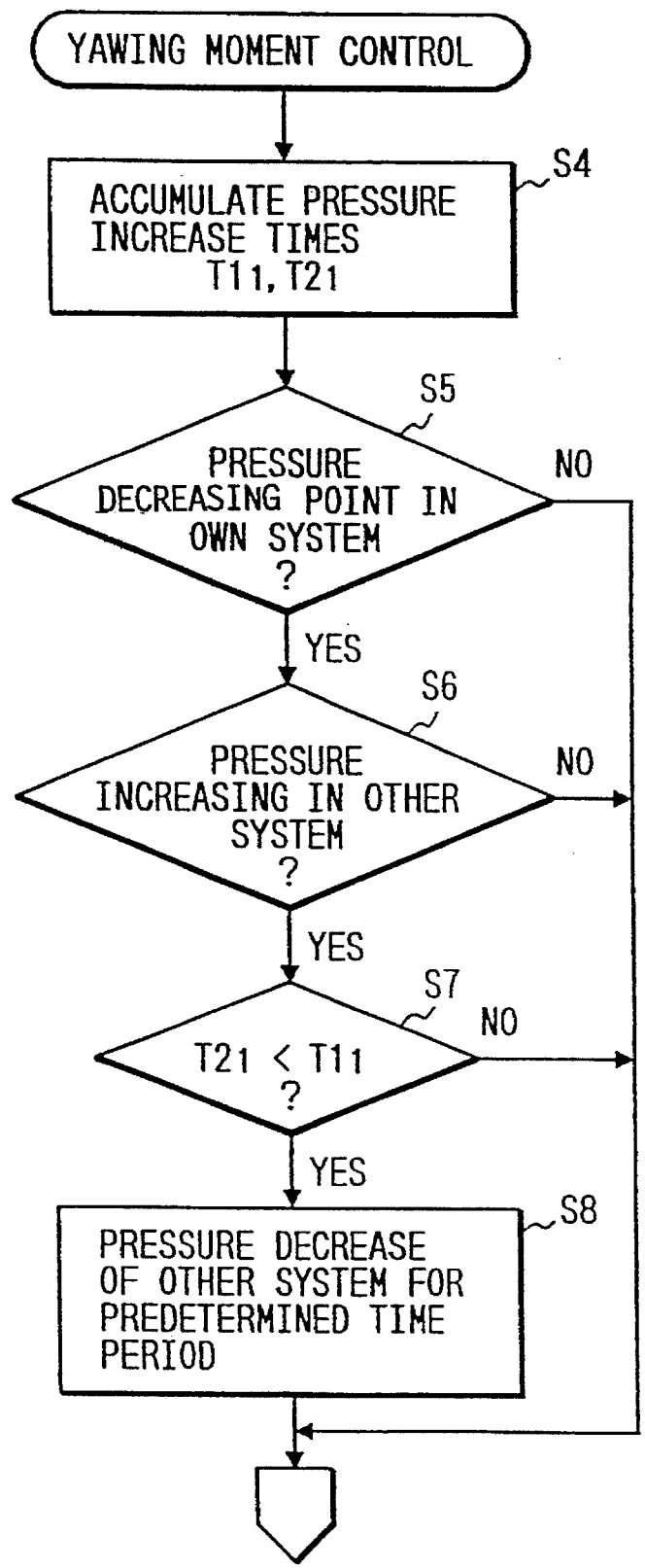
FIG. 9 is a flow chart showing the yawing moment generation preventing control according to the second embodiment of the present invention shown in FIG. 8.
Figure 10:
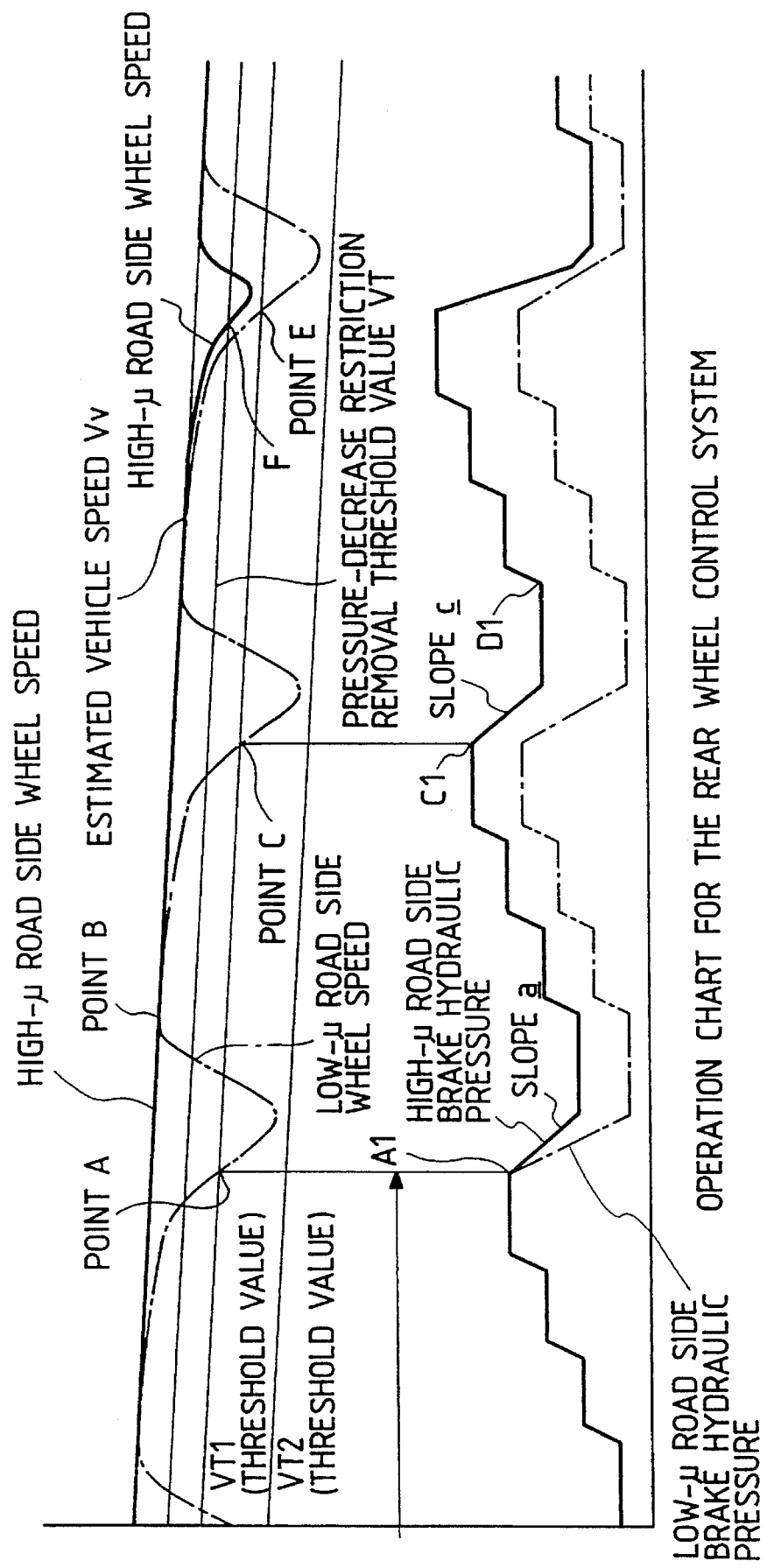
FIG. 10 is a graph showing relationships between the brake hydraulic pressures and wheel speeds in a restriction control of decreasing the brake hydraulic pressure to the select high rear wheel.
Figure 11:
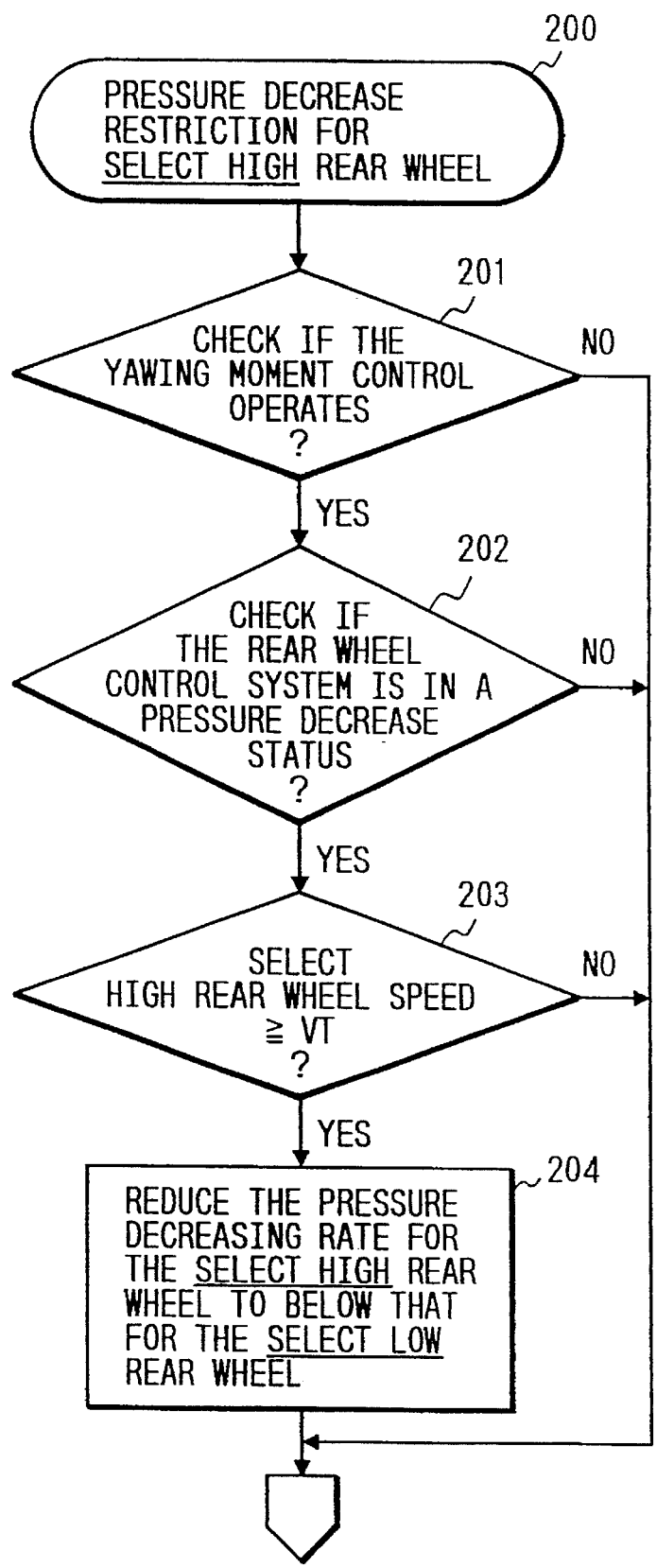
FIG. 11 is a flow chart showing the restriction control of decreasing the brake hydraulic pressure to the select high rear wheel.

FIG. 1 is a block diagram showing an anti-lock control system according to an embodiment of the present invention. FIG. 2 is a graph showing relationships between brake hydraulic pressure of the front wheels vs. wheel speed when an anti-lock control is carried out. FIGS. 7 and 9 are flow charts showing yawing moment controls of the front wheels. FIG. 10 is a graph showing relationships of brake hydraulic pressure and wheel speed, the graph useful in explaining a restriction control of the pressure of the brake hydraulic pressure to the select high rear wheels when the front wheels are in a yawing moment control mode. FIG. 11 is a flow chart showing a restriction control of the pressure decrease of the brake hydraulic pressure to the select high rear wheels according to the present invention.

A basic arrangement of an anti-lock control system according to the present invention will be described with reference to the basic structural diagram shown in FIG. 1. As shown, the anti-lock control system is made up of four antilock control systems or channels for four wheels. Output signals of a left front wheel speed sensor 1, a right front wheel speed sensor 2, a left rear wheel speed sensor 3, and a right rear wheel speed sensor 4 are respectively fed to computing circuits 5, 6, 7, and 8. The computing circuits 5 to 8 calculate and output wheel speeds $Vw_1$, $Vw_2$, $Vw_3$, and $Vw_4$ in accordance with vehicle speeds. An estimated vehicle speed computing circuit 13 calculates a speed (estimated vehicle speed Vv) of which the highest speed follow-up limit is set to within ±1G, on the basis of the highest speed of those wheel speeds (select high), and inputs the result of the computation to control logic circuits 9, 10, 11, and 12. A comparator 23 performs a predetermined operation using the output signals of pressure increase time accumulating circuits 21 and 22 in order to execute a yawing moment control, and outputs the result of the operation to the logic circuits 9 and 10.

A threshold speed computing circuit 14 calculates first and second pressure decrease threshold values VT1 and VT2 using the estimated vehicle speed Vv, and inputs the results of the computation to the control logic circuits 9 to 12. The right and left rear wheels are provided with a low select circuit 19 and a high select circuit 20, respectively. The output signals of these select circuits are input to the control logic circuits 11 and 12, respectively. The logic circuits 11 and 12 execute the control for effectively utilizing the braking force to the wheel on the high-μ road surface when the front wheels are in a yawing moment control mode to be given later.

The control logic circuits 9 to 12 control modulators 15, 16, 17, and 18 for the respective wheels on the basis of the wheel speeds $Vw_1$, $Vw_2$, $Vw_3$, and $Vw_4$, the estimated vehicle speed Vv, and the threshold values VT1 and VT2. This control progresses while turning on and off a hold valve HV and a decay valve DV are turned on and off, whereby an anti-lock skid control is performed for the respective wheels.

A yawing moment control for the front wheels by the thus arranged anti-lock control system when one of the front wheels runs on a low-μ road surface, and a control of the rear wheels by the same when the front wheels are in a yawing moment control mode will be described with reference to FIGS. 2 to 11.

Yawing Moment Control for the Front Wheel

FIG. 2 is a timing chart showing one example of a basic idea of an anti-lock control system and method upon which the present invention is based. The system speed Vs, recovered by the pressure decrease in the preceding control cycle, exceeds the first threshold speed VT1 at a time point t1, and then reaches the high peak at a time point t2. At this time point t2, the control is switched from the hold mode to the pressure increase mode, and the hold signal HS is switched between the ON state and the OFF state at short intervals to repeat the opening and closing of the hold valve HV, so that the brake hydraulic pressure Pw increases stepwise. The deceleration of the system speed Vs which has begun to decrease by this pressure increase reaches a predetermined value (for example, −1G) at a time point t3, and there is set the reference speed Vr which linearly decreases with a slope of the above predetermined deceleration (−1G). Vr has a starting point which is lower a predetermined value ΔV than the system speed Vs at the time point t3.

Then, the decay signal DS goes to the ON state at an earlier one of two time points. That is, at the time point when the system speed Vs goes below the reference speed Vr and the time point when the system speed Vs goes below the first threshold speed VT1, the decay valve DV is opened to start the pressure decrease mode. In FIG. 2, the pressure decrease mode begins from a time point t4 at which the system speed Vs goes below the first threshold speed VT1. Then, if the low peak point of the system speed Vs is between the two threshold speeds VT1 and VT2 as indicated by a solid line in FIG. 2, the pressure decrease mode is finished at a time point t5 at which the above low peak point is obtained, and the hold mode begins therefrom. However, if the system speed Vs goes below the second threshold speed VT2 at a time point t5, the pressure decrease mode continues up to a time point t5', that is, until the system speed Vs is recovered to the second threshold speed VT2, as indicated by a broken line in FIG. 2.

Figure 3:
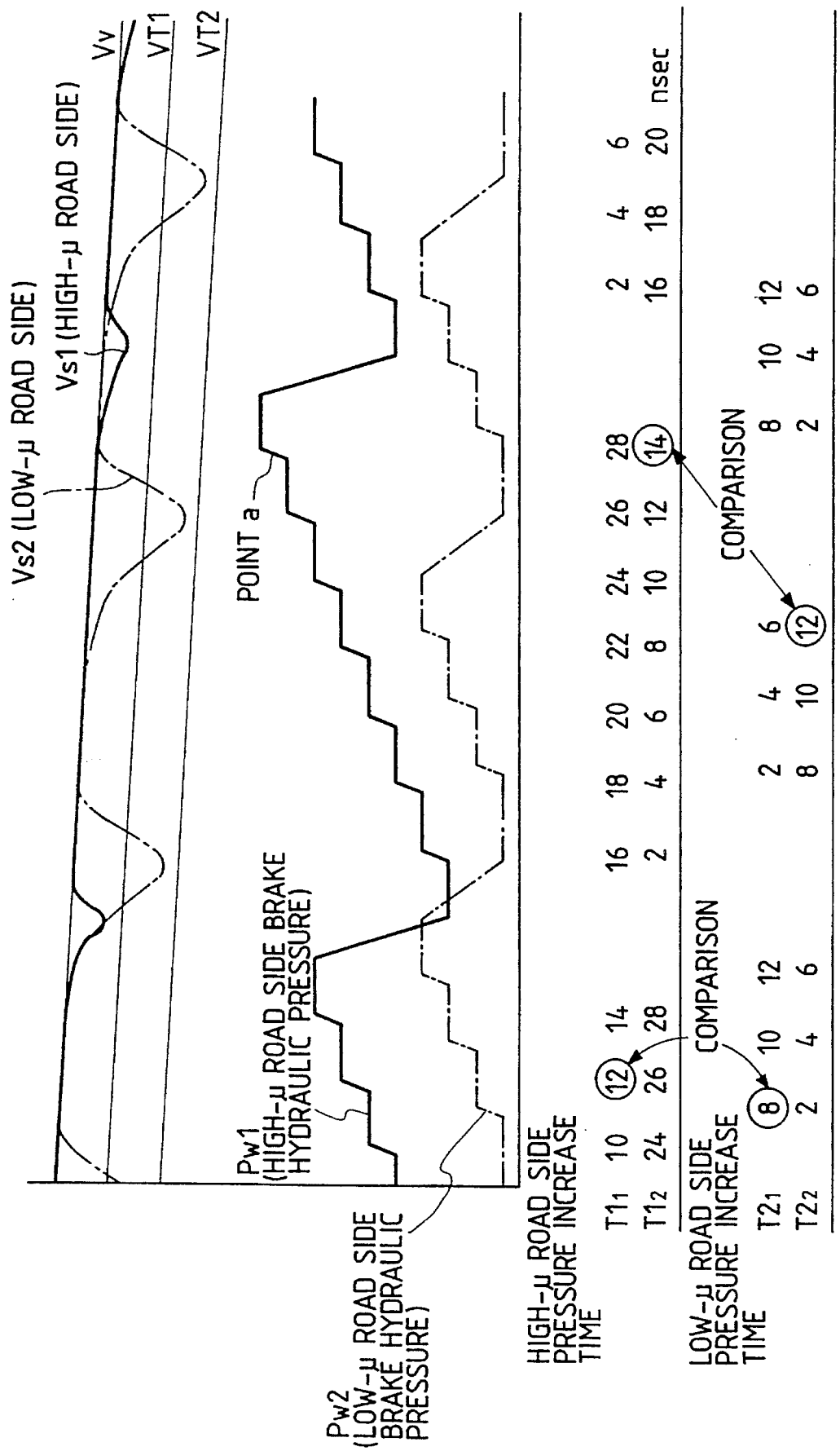
FIG. 3 is a timing chart showing a first embodiment of a yawing moment generation preventing control in an anti-lock control system and method according to the present invention.

FIG. 3 is a timing chart showing a first embodiment of the anti-lock control system and method of the present invention. In FIG. 3, the front wheel speed for the high-µ road surface is represented by the first control speed Vs1, and the front wheel speed for the low-µ road surface is represented by the second control speed Vs2. There are large differences in the pressure increase amount and the control cycle between the brake hydraulic pressure Pw1 for the high-µ road surface side control system and the brake hydraulic pressure Pw2 for the low-µ road surface side control system. The pressure increase times T1 and T2 of two systems are accumulated during two cycles of the anti-lock control in the two control system by the pressure increase time-accumulating circuits 15 and 16 shown in FIG. 1, respectively, and the accumulation results (unit: msec) of which are shown in FIG. 3.

As is clear from FIG. 3, the pressure increase time of the two control systems during two cycles are accumulated in such a manner that they are shifted one cycle from each other. The results of accumulation of the pressure increase times during one cycle and during two cycles can always be detected simultaneously. The accumulated pressure increase time for the high-µ road surface during one cycle is compared with the accumulated pressure increase time for the low-µ road surface during two cycles, using the comparator circuit 23 shown in FIG. 1. At a time point a in FIG. 3 at which the accumulated pressure increase time for the high-µ road surface during one cycle becomes greater then the accumulated pressure increase time for the low-µ road surface during two cycles, it is determined that the difference between the pressure increase amounts of the right and left wheels exceeds a predetermined value due to the µ split road surface, so that the control for the front wheel on the high-µ road surface is reduced. Thus, the set value is changed so that an excessive increase of the brake hydraulic pressure is prevented so as to reduce the rate of utilization of the road by the high-µ road surface side front wheel, thereby preventing the generation of a yawing moment.

Figure 4:
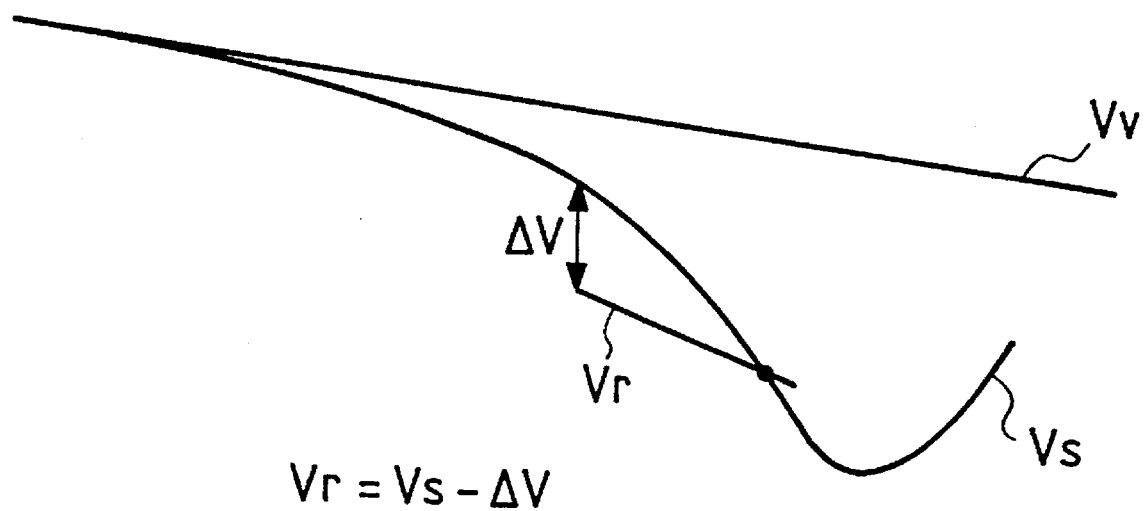
FIG. 4 is an explanatory diagram showing a method for putting a pressure decrease starting point early in the control system for the wheel on the high-μ road surface.
Figure 4:
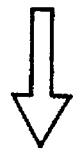
Figure 4:
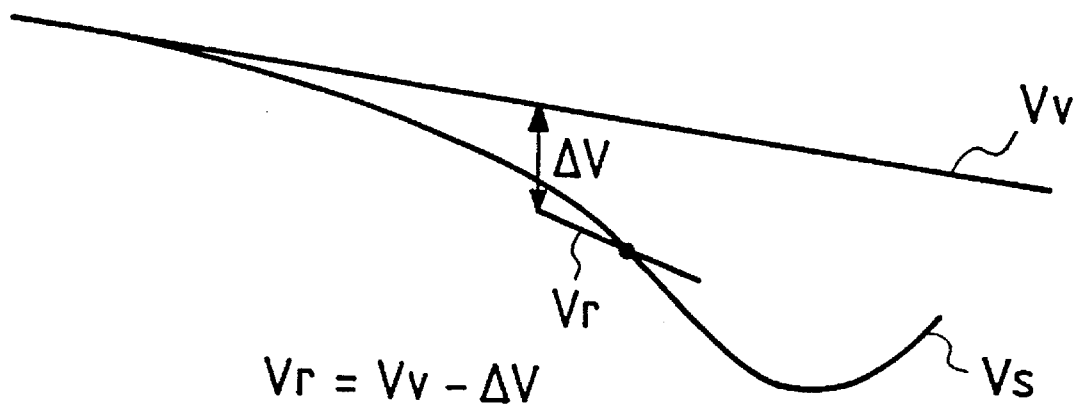
Figure 5:
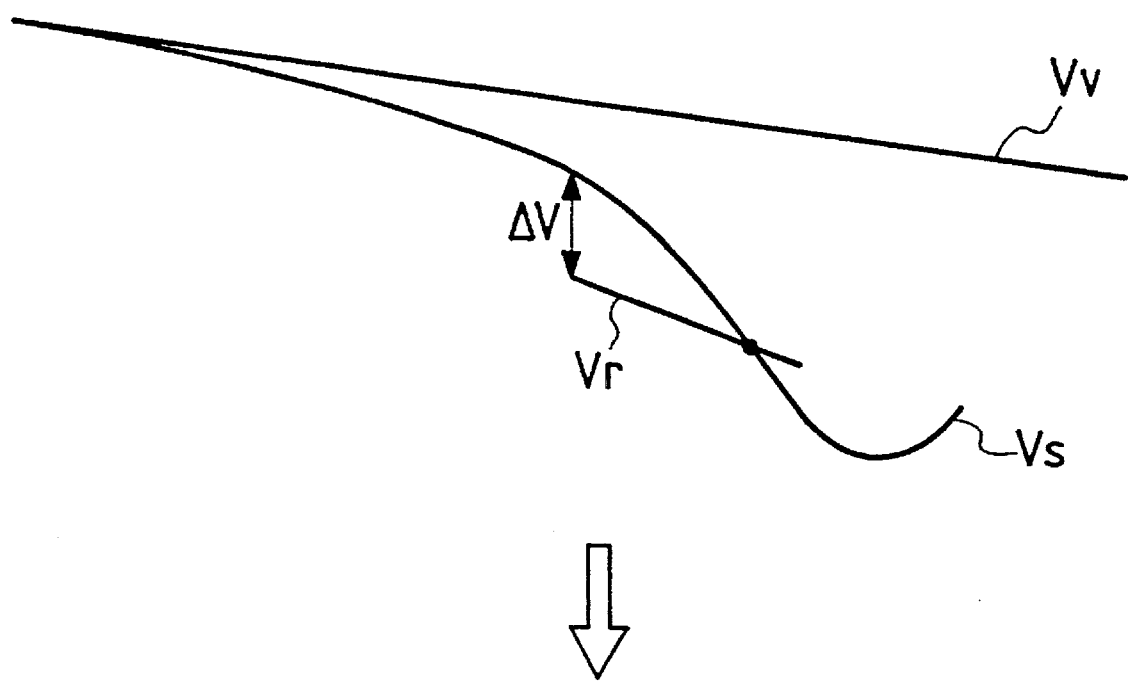
FIG. 5 is an explanatory diagram showing another method for putting a pressure decrease starting point early in the control system for the wheel on the high-μ road surface.
Figure 5:
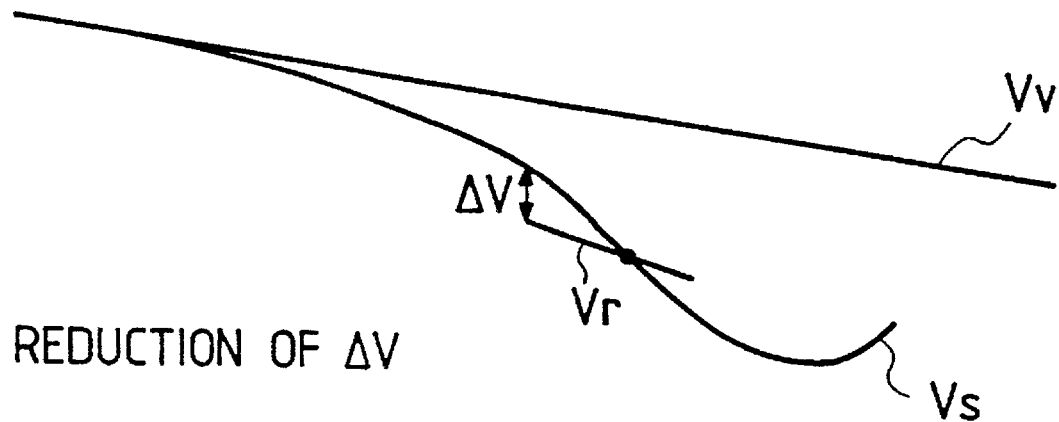
Figure 6:
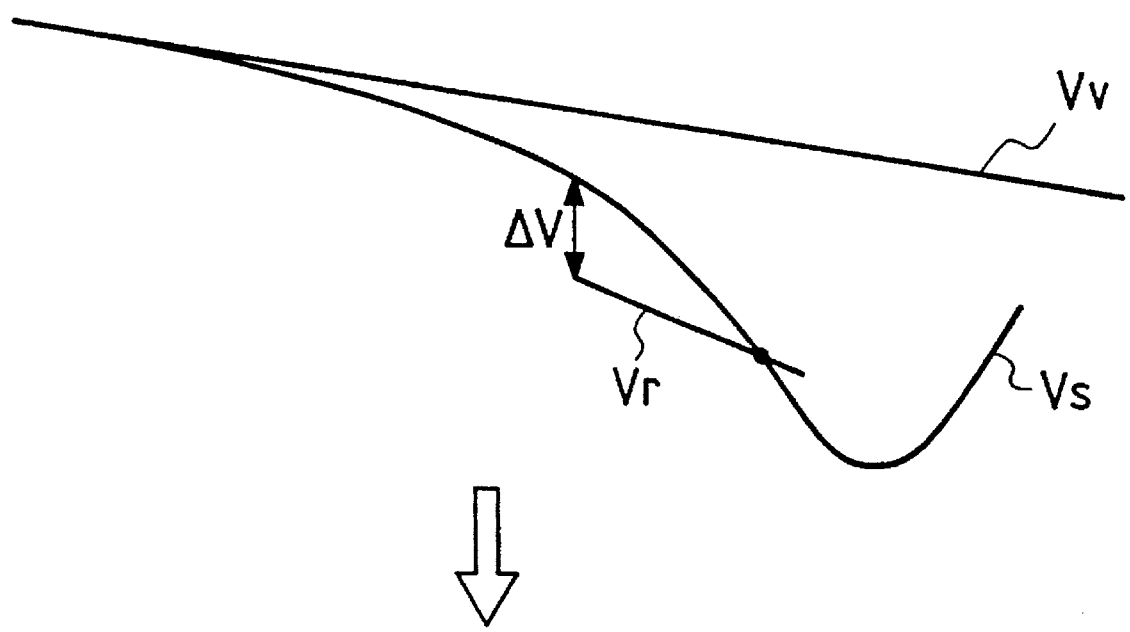
FIG. 6 is an explanatory diagram showing yet another method for putting a pressure decrease starting point early in the control system for the wheel on the high-μ road surface.
Figure 6:
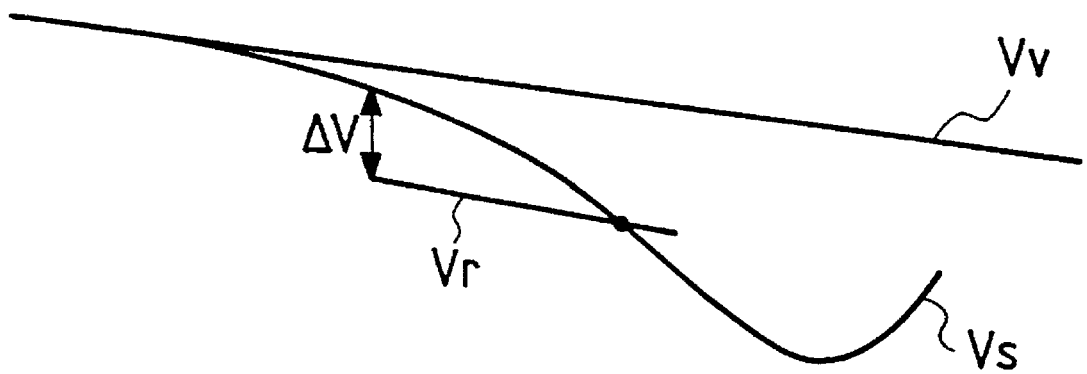

This change of the set value is achieved, for example, by setting the starting point of the reference speed Vr to a speed (Vv−ΔV) which is lower than the estimated vehicle speed Vv by ΔV, as shown in FIG. 4. In the conventional method, the starting point of the reference speed Vr at the time point t3 (FIG. 2) has been set to the speed (Vs−ΔV) lower ΔV than the system speed Vs. Alternatively, the value of ΔV may be made small as shown in FIG. 5. Also, as shown in FIG. 6, so that the point of generation of the reference speed Vr can be earlier, the value of deceleration of the system speed Vs at the time of generation of the reference speed Vr may be made smaller so as to make the slope or gradient of the reference speed Vr gentler. For example, this value is changed from −1G to −0.5G. With any of these changes, the time for starting the pressure decrease in the high-µ road surface side control system can be made earlier than usual, and by doing so, an excessive increase of the brake hydraulic pressure in the high-µ road surface side control system can be restrained.

FIG. 7 shows a flow chart for the yawing moment generation prevention control of the first embodiment of the present invention shown in FIG. 3. First, in a step S1, the pressure times for the two control systems during one cycle or two cycles are accumulated (T1$_1$, T1$_2$, T2$_1$, T2$_2$), as shown in FIG. 3. Then, in a step S2, the accumulated pressure increase time T1$_1$ for the high-µ road side system for the first cycle is compared with the accumulated pressure increase time T2$_2$ for the low-µ road side system for the second cycle. If the result is T1$_1$>T2$_2$, the set value is changed in the high-µ road surface side system in a step S3 in the manner shown in FIGS. 4 to 6, thereby making the pressure decrease-starting point earlier.

Figure 8:
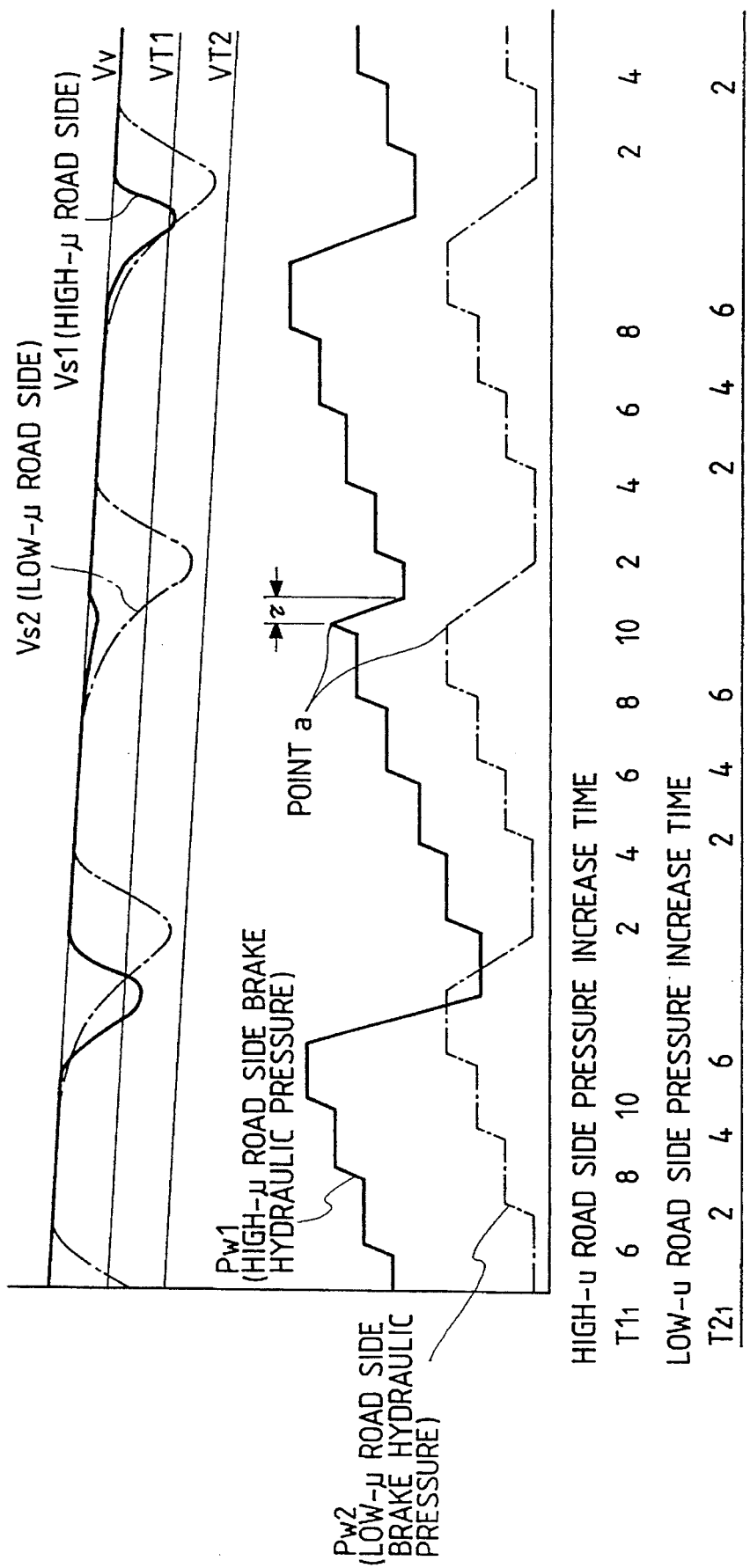
FIG. 8 is a timing chart showing a second embodiment of a yawing moment generation preventing control in an anti-lock control system and method according to the present invention.

FIG. 8 is a timing chart of a second embodiment of an anti-lock control system and method of the present invention. In this embodiment, unlike the first embodiment, only the pressure increase time during one cycle for each of the two control systems is accumulated. If the pressure decrease-starting point is reached in one of the control systems, the other control system is in the pressure increase mode, and if the accumulated pressure increase time T1$_1$ for one system during one cycle is greater than the accumulated pressure increase time T2$_1$ for another system (the point a in FIG. 8), the brake hydraulic pressure in the other system (the high-µ road surface side) is reduced for a predetermined time period τ, thereby preventing the brake hydraulic pressure of the high-µ road surface side from increasing too sharply.

FIG. 9 is a flowchart for the yawing moment generation prevention control of the second embodiment of the present invention shown in FIG. 8. Namely, in FIG. 9, first, in a step S4, pressure increase times for the two control systems during one cycle are accumulated (T1$_1$, T2$_1$) as shown in FIG. 7. In the next step S5, it is judged whether or not the pressure decrease-starting point is reached in its own system. If this judgement result is "YES", it is judged in a step S6 whether or not the other system is in the pressure increase mode. If this judgement result is "YES", the pressure increase time T2$_1$ for its own system during one cycle is compared with the pressure increase time T1$_1$ for the other system during one cycle in a step S7. If T2$_1$<T1$_1$ is satisfied, the other system (high-µ road surface side in this case) is subjected to a pressure decrease for a predetermined time period τ, thereby preventing an abrupt increase of the brake hydraulic pressure for the high-µ road surface side.

Control of the Rear Wheels

In the brake control chart for the rear wheels shown in FIG. 10, at a time point where the brake control, continued from the start of the yawing moment control of the front wheels, reaches a point A where a range of the control state indicated by Z terminates, one of the select low rear wheels (e.g., the left rear wheel speed in FIG. 1), for example, the rear wheel on the low-µ road surface, in this instance, is locked. Upon locking, the wheel speed decreases below the threshold value VT1 (point A). In the brake control, the brake hydraulic pressure to the rear wheel on the low-µ road surface decreases to release the wheel from its locked state. The pressure decrease starts at a point A1. At the same time, the brake hydraulic pressure to the rear wheel (e.g., the right rear wheel speed in FIG. 1) on the high-µ road surface is also decreased.

In the present embodiment, when the wheel speed of the wheel on the high-µ road surface is higher than the pressure-decrease restriction removal threshold value VT, a rate (represented by a slope a) of decreasing the brake hydraulic pressure to the wheel on the high-µ road surface is smaller than a decreasing rate of the brake hydraulic pressure to the wheel on the low-µ road surface. In other words, the brake hydraulic pressure to the rear wheel on the high-µ road surface decreases more slowly than that to the rear wheel on the low-µ road surface.

The embodiment employs the duty control method for the decrease of the brake hydraulic pressure to the rear wheel on the high-μ road surface. The duty control method is based on the control of the on and off time durations of the hold valve HV and the decay valve DV. Another suitable control method may be used for the same purpose, as a matter of course. With this pressure decrease, a higher brake hydraulic pressure is applied to the wheel on the high-μ road surface than to the wheel on the low-μ road surface. Thereafter, the wheel speed of the wheel on the low-μ road surface increases again. At a point B, for both the wheels on the high and low-μ road surfaces, the control mode of the brake hydraulic pressure shifts from the hold mode to the gentle pressure increase mode. In the gentle pressure increase mode, the brake hydraulic pressures to both the wheels on the high and low-μ road surfaces are increased while keeping the difference previously caused between the brake hydraulic pressures to those wheels.

The braking force excessively increases again, so that the wheel speed of the wheel on the low-μ road surface decreases to below the threshold value VT1 (at a point C). From this point, the brake hydraulic pressures applied to the wheels on the high and low-μ road surfaces decrease again (point C1), as previously. Also at this time, when the wheel speed of the wheel on the high-μ road surface is higher than the pressure-decrease restriction removal threshold value VT, a decreasing rate (represented by a slope c) of the brake hydraulic pressure to the wheel on the high-μ road surface is smaller than that of the brake hydraulic pressure to the wheel on the low-μ road surface. Accordingly, a difference of the brake hydraulic pressure is caused between the wheels of the high and low-μ road surfaces, as in the previous state of the brake control. Thereafter, the wheel speed of the wheel on the low-μ road surface increases again. At a point D1, for both the wheels on the high and low-μ road surfaces, the control mode of the brake hydraulic pressure shifts from the hold mode to the gentle pressure increase mode. Also in this gentle pressure increase mode, the brake hydraulic pressures to both the wheels on the high and low-μ road surfaces increase while keeping the sum of the brake hydraulic pressure difference caused previously, and that caused this time.

Repeating this brake control, such a situation that the wheel speed of the wheel on the low-μ road surface becomes lower than the threshold value VT1 (at a point E), an excessive braking force acts on the wheel on the high-μ road surface, and the wheel speed of the wheel on the high-μ road surface becomes lower than the pressure-decrease restriction removal threshold value VT (at a point F), may take place (the wheel on the high-μ road surface is also locked.). In this case, the brake hydraulic pressure to the wheel on the high-μ road surface must also be released abruptly. To this end, the following control is executed in the present invention.

The wheel speed of the wheel on the low-μ road surface decreases below the threshold value VT1 again, and the wheel speed of the wheel on the high-μ road surface on the high-μ road surface decreases below the pressure-decrease restriction removal threshold value VT. Then, the brake hydraulic pressure to the wheel on the high-μ road surface is decreased to be nearly equal to that to the wheel on the low-μ road surface, thereby preventing both the wheels on the high and μ road surfaces from being locked (In the graph shown in FIG. 10, at a time point, viz., a time point F, where the wheel speed of the wheel on the high-μ road surface is lower than the pressure-decrease restriction removal threshold value VT, the wheel speed of the wheel on the low-μ road surface is still higher than the threshold value VT1, the brake hydraulic pressure is in the hold mode. The brake hydraulic pressures to the both wheels are simultaneously decreased only when the wheel speed of the wheel on the low-μ road surface is lower than the threshold value VT1, viz., at a time point E.). Subsequently, when the wheel speeds of the wheels on the high and low-μ road surfaces increase again, the control mode of the brake hydraulic pressure shifts from the hold mode to the gentle pressure increase mode as in the previous state of the brake control.

Through the rear-wheel brake control thus performed, the braking forces of the rear wheels under control of select high can be effectively utilized, thereby further reducing the braking distance.

A flow chart charting a restriction control of decreasing the brake hydraulic pressure to the select high rear wheel will be described with reference to FIG. 11.

In a step 200, a program of the restriction control of decreasing the brake hydraulic pressure to the select high rear wheel starts. In a step 201, a system control checks whether or not the front wheels are placed in the yawing moment control mode. If the wheels are in the yawing moment control mode, the system control advances to a step 202. In the step, the system control checks whether or not the brake control system for the rear wheels is in a pressure decrease status. In other words, the system control checks whether or not the wheel speed of the select low rear wheel decreases below the threshold value VT1 and a pressure decrease mode is set up.

If the select low wheel (the wheel on the low-μ road surface) is in the pressure decreasing mode, the control advances to a step 203. In this step, the control checks if the speed of the select high wheel (the wheel on the high-μ road surface) is larger than the pressure-decrease restriction removal threshold value VT. If the speed of the select high wheel is larger than the pressure-decrease restriction removal threshold value VT, the control advances to a step 204. In this step, the brake hydraulic pressure to the select high wheel is decreased at a smaller decreasing rate than that to the lower speed wheel. The decreasing rate is set for the type of used vehicles in the stage of design. Sometimes it is held. In this way, the decrease of the brake hydraulic pressure to the wheel of the select high is not excessive, thereby preventing the braking distance from being elongated.

If in the step 201, the control determines that the brake control system is not in the yawing moment control, the control returns to the initial step of the program and repeats the sequence of control steps. Also in a case where the rear wheel brake control system is not in a pressure decrease status, the control returns to the .initial step. Further, when the control determines that the speed of the select high wheel is lower than the pressure-decrease restriction removal threshold value VT (or that the select high wheel is locked), the pressure decreasing rate of the select high wheel is released from its restriction, so that the brake hydraulic pressure to the select high wheel is decreased as when the brake hydraulic pressure to the select low wheel is decreased. In this way, when on the μ split road, the front wheels are in the yawing moment control mode, the rear wheels are controlled such that the brake hydraulic pressure to the lower speed rear wheel is decreased on the basis of the select low control, while at the same time, a pressure decreasing rate of the wheel of the select high (the higher speed wheel) is restricted. Therefore, the braking force to the select high wheel can be effectively utilized.

As seen from the foregoing detailed description, on a normal road surface, the wheels on the high and low-μ road surfaces are controlled using substantially equal brake hydraulic pressures. On a called μ split road, the following brake control is applied to the front and rear wheels. In a state that the front wheels are in the yawing moment control mode, the speed of the rear wheel on the low-μ road surface (select low) decreases below the threshold value VT1 but the speed of the wheel on the high-μ road surface a little decreases (no slip state takes place), the quantity of the pressure decrease of the brake hydraulic pressure to the rear wheel on the high-μ road surface is restricted with respect to that of the brake hydraulic pressure to the rear wheel on the low-μ road surface. Therefore, the braking force of the wheel on the high-μ road surface can be utilized more effectively, thereby realizing a further reduction of the braking distance.

What is claimed is:

1. The anti-lock brake control method which independently controls brake pressures applied to right and left front wheels, and controls brake pressures applied to the right and left rear wheels on the basis of a lower one of wheel speeds of the right and left rear wheels, the method comprising the steps of:

first checking whether or not the front wheels are placed in a yawing moment control mode;

second checking whether or not the brake control system for each rear wheel is in a pressure decrease mode when the front wheels are determined to be in the yawing moment control mode;

third checking if the speed of a first selected one of the rear wheels is larger than a predetermined pressure-decrease restriction removal threshold value when a second selected one of the rear wheels is determined to be in the pressure decreasing mode, the first selected rear wheel travelling over a surface having a high coefficient of friction relative to a surface upon which the second selected rear wheel travels; and decreasing the brake hydraulic pressure to the first selected rear wheel at a smaller decreasing rate than the hydraulic pressure applied to the second selected rear wheel when the speed of the first selected rear wheel is determined to be larger than the pressure-decrease restriction removal threshold value, wherein the first checking step comprises the steps of:

accumulating pressure increase times for high-μ and low-μ road side systems during at least two cycles corresponding to the rear wheels, the high-μ and low-μ road side systems travelling over surfaces having a high and low coefficient of friction, respectively;

comparing the pressure increase time for the high-μ road side system accumulated during the first cycle with the pressure increase time for the low-μ road side system accumulated during the second cycle; and changing a set value in the high-μ road surface side system to invoke the pressure decrease mode earlier when the pressure increase time for the high-μ road side system accumulated during the first cycle is larger than the pressure increase time for the low-μ road side system accumulated during the second cycle.

2. The anti-lock brake control method which independently controls brake pressures applied to right and left front wheels, and controls brake pressures applied to the right and left rear wheels on the basis of a lower one of wheel speeds of the right and left rear wheels, the method comprising the steps of:

first checking whether or not the front wheels are placed in a yawing moment control mode;

second checking whether or not the brake control system for each rear wheel is in a pressure decrease mode when the front wheels are determined to be in the yawing moment control mode;

third checking if the speed of a first selected one of the rear wheels is larger than a predetermined pressure-decrease restriction removal threshold value when a second selected one of the rear wheels is determined to be in the pressure decreasing mode, the first selected rear wheel travelling over a surface having a high coefficient of friction relative to a surface upon which the second selected rear wheel travels; and decreasing the brake hydraulic pressure to the first selected rear wheel at a smaller decreasing rate than the hydraulic pressure applied to the second selected rear wheel when the speed of the first selected rear wheel is determined to be larger than the pressure-decrease restriction removal threshold value, wherein said first checking step comprises the steps of:

accumulating pressure increase times for a first and second control systems during one cycle;

judging whether or not a pressure decrease-starting point is reached in the first system;

judging whether or not the second system is in the pressure increase mode when the pressure decrease-starting point is reached in the first system;

comparing the pressure increase time for the first system during one cycle with the pressure increase time for the second system during one cycle when the second system is in the pressure increase mode and the first system has reached the pressure decrease-starting point; and subjecting the second system to a pressure decrease for a predetermined time period when the pressure increase time for said first system during one cycle is larger than the pressure increase time $T1_1$ for said second system during one cycle, the second system is in the pressure increase mode and the first system has reached the pressure decrease-starting point.

3. The anti-lock brake control method according to claim 2, wherein the first system corresponds with a low-μ road surface side and the second system corresponds with a high-μ road surface side.

4. An anti-lock brake control method which independently controls brake pressures applied to right and left front wheels, and controls brake pressures applied to the right and left rear wheels on the basis of a lower one of wheel speeds of the right and left rear wheels, the method comprising the steps of:

first checking whether or not the front wheels are in a yawing moment control mode;

second checking whether or not the brake control system for each rear wheel is in a pressure decrease mode when the front wheels are determined to be in the yawing moment control mode;

third checking if the speed of a first selected one of the rear wheels is larger than a predetermined pressure-decrease restriction removal threshold value when a second selected one of the rear wheels is determined to be in the pressure decreasing mode, the first selected rear wheel travelling over a surface having a high coefficient of friction relative to a surface upon which the second selected rear wheel travels; and decreasing the brake hydraulic pressure to the first selected rear wheel at a smaller decreasing rate than the hydraulic pressure applied to the second selected rear wheel when the speed of the first selected rear wheel is determined to be larger than the pressure-decrease restriction removal threshold value, the second selected rear wheel is determined to be in the pressure decreasing mode, and the front wheels are determined to be in the yawing moment control mode.

* * * * *